US007608216B2

(12) United States Patent  
Park et al.

(10) Patent No.: US 7,608,216 B2
(45) Date of Patent: Oct. 27, 2009

(54) METHODS FOR PREPARING ARTICLES FROM PROCESSABLE AND DIMENSIONALLY STABLE ELASTOMER COMPOSITIONS

(75) Inventors: Edward H. Park, Saline, MI (US); Francis Joseph Walker, Tecumseh, MI (US)

(73) Assignee: Freudenberg-Nok General Partnership, Plymouth, MI (US)

( * ) Notice: Subject to any disclaimer, the term of this patent is extended or adjusted under 35 U.S.C. 154(b) by 294 days.

(21) Appl. No.: 11/646,315

(22) Filed: Dec. 27, 2006

(65) Prior Publication Data

US 2008/0157439 A1 Jul. 3, 2008

(51) Int. Cl.
C08K 3/28 (2006.01)
B29C 35/08 (2006.01)
B29C 45/00 (2006.01)
B29C 47/00 (2006.01)
B29C 49/00 (2006.01)

(52) U.S. Cl. .................. 264/459; 264/470; 264/473; 264/477; 264/478; 264/483; 264/485; 264/488; 264/492; 522/109; 522/110

(58) Field of Classification Search .................. 264/496, 264/459, 470, 473, 478, 483, 485, 488, 492; 522/109, 111, 112, 110; 526/242–255

See application file for complete search history.

(56) References Cited

U.S. PATENT DOCUMENTS

| | | | |
|---|---|---|---|
| 2,972,600 A | 2/1961 | Braidwood | |
| 3,287,440 A | 11/1966 | Giller | |
| 4,035,565 A | 7/1977 | Apotheker et al. | |
| 4,094,949 A | 6/1978 | Yokokawa et al. | |
| 4,104,210 A * | 8/1978 | Coran et al. | 525/232 |
| 4,233,421 A | 11/1980 | Worm | |
| 4,358,559 A | 11/1982 | Holcomb et al. | |
| 4,446,270 A | 5/1984 | Guenthner et al. | |
| 4,696,989 A | 9/1987 | Oka et al. | |
| 4,808,665 A | 2/1989 | Patel et al. | |
| 4,912,171 A | 3/1990 | Grootaert et al. | |
| 5,006,594 A | 4/1991 | Rees | |
| 5,055,539 A | 10/1991 | Hengel et al. | |
| 5,206,293 A | 4/1993 | Sakai et al. | |
| 5,262,490 A | 11/1993 | Kolb et al. | |
| 5,354,811 A | 10/1994 | Kamiya et al. | |
| 5,371,143 A | 12/1994 | Novak et al. | |
| 5,384,374 A | 1/1995 | Guerra et al. | |
| 5,910,544 A | 6/1999 | Ozawa et al. | |
| 6,054,537 A | 4/2000 | Shimizu et al. | |
| 6,066,697 A | 5/2000 | Coran et al. | |
| 6,207,758 B1 * | 3/2001 | Brinati et al. | 525/200 |
| 6,277,916 B1 * | 8/2001 | Terbrueggen et al. | 525/95 |
| 6,310,141 B1 | 10/2001 | Chen et al. | |
| 6,407,174 B1 | 6/2002 | Ouhadi | |
| 6,437,030 B1 | 8/2002 | Coran et al. | |
| 6,624,251 B1 | 9/2003 | Chmielewski | |
| 6,649,217 B1 | 11/2003 | Gust | |
| 6,737,479 B2 | 5/2004 | Faulkner | |
| 6,806,306 B2 | 10/2004 | Chmielewski et al. | |
| 7,022,769 B2 | 4/2006 | Park | |
| 7,135,122 B2 | 11/2006 | Park | |
| 7,230,038 B2 * | 6/2007 | Park | 522/187 |
| 7,365,131 B2 * | 4/2008 | Ajbani et al. | 525/191 |
| 2002/0198320 A1 | 12/2002 | Chmielewski | |
| 2003/0125466 A1 | 7/2003 | Chmielewski | |
| 2003/0166780 A1 | 9/2003 | Shimizu et al. | |
| 2004/0115450 A1 * | 6/2004 | Bendler et al. | 428/480 |
| 2004/0181022 A1 | 9/2004 | Saito et al. | |
| 2004/0183702 A1 | 9/2004 | Nachtigal et al. | |
| 2004/0260023 A1 | 12/2004 | Park et al. | |
| 2005/0155690 A1 | 7/2005 | Park | |
| 2005/0165168 A1 | 7/2005 | Park | |
| 2005/0167928 A1 | 8/2005 | Park et al. | |
| 2005/0171282 A1 | 8/2005 | Park | |
| 2005/0222337 A1 | 10/2005 | Park | |
| 2005/0245679 A1 * | 11/2005 | Ajbani et al. | 525/66 |
| 2005/0272872 A1 | 12/2005 | Park | |

(Continued)

FOREIGN PATENT DOCUMENTS

EP 0168020 10/1989

(Continued)

OTHER PUBLICATIONS

"Fluorine-Containing Polymers" Encyclopedia of Polymer Science & Engineering, vol. 7, Second Edition (1987). (pp. 256-267).

(Continued)

Primary Examiner—Susan W Berman
(74) Attorney, Agent, or Firm—Ronald W. Wangerow; Harness, Dickey & Pierce, P.L.C.

(57) ABSTRACT

Methods for preparing a shaped rubber article, comprising admixing at least one thermoplastic material and at least one elastomer material to provide a processable and dimensionally stable rubber composition, shaping the composition, and irradiating the composition to form the shaped rubber article. The dimensional stability of the uncured composition may be provided by partial dynamic vulcanization, high performance reinforcing fillers, fractional curing, or combinations thereof. The elastomer material is present in an amount greater than about 65% by weight based on the total weight of the thermoplastic and elastomer materials present in the admixture.

32 Claims, No Drawings

U.S. PATENT DOCUMENTS

| | | |
|---|---|---|
| 2005/0275565 A1 | 12/2005 | Nachtigal et al. |
| 2005/0281973 A1 | 12/2005 | Park |
| 2006/0000801 A1 | 1/2006 | Park |
| 2006/0003126 A1 | 1/2006 | Park et al. |
| 2006/0003127 A1 | 1/2006 | Park et al. |
| 2006/0004117 A1 | 1/2006 | Park |
| 2006/0004126 A1 | 1/2006 | Park et al. |
| 2006/0004142 A1 | 1/2006 | Park et al. |
| 2006/0004147 A1 | 1/2006 | Park et al. |
| 2006/0099368 A1 | 5/2006 | Park |
| 2006/0100333 A1 | 5/2006 | Park |
| 2006/0100368 A1 | 5/2006 | Park |
| 2006/0124889 A1 | 6/2006 | Park et al. |
| 2006/0142467 A1 | 6/2006 | Park |
| 2006/0142491 A1 | 6/2006 | Park |
| 2006/0142492 A1 | 6/2006 | Park |
| 2006/0148954 A1 | 7/2006 | Park et al. |
| 2006/0290070 A1 | 12/2006 | Park |
| 2006/0293460 A1* | 12/2006 | Jacob et al. ............... 525/240 |
| 2007/0004862 A1 | 1/2007 | Park et al. |
| 2007/0004865 A1 | 1/2007 | Park |
| 2007/0019545 A1* | 1/2007 | Alt et al. ................... 370/230 |
| 2007/0036980 A1 | 2/2007 | Park |
| 2007/0044906 A1 | 3/2007 | Park |
| 2007/0045967 A1 | 3/2007 | Park |
| 2007/0048476 A1 | 3/2007 | Park |
| 2007/0055020 A1 | 3/2007 | Park |
| 2007/0060707 A1 | 3/2007 | Park |
| 2007/0092731 A1 | 4/2007 | Park et al. |
| 2007/0095790 A1 | 5/2007 | Park |
| 2007/0142555 A1 | 6/2007 | Park |
| 2007/0167574 A1 | 7/2007 | Park |
| 2007/0210530 A1 | 9/2007 | Park |
| 2007/0213423 A1 | 9/2007 | Park |
| 2008/0149881 A1 | 6/2008 | Park |
| 2008/0303184 A1 | 12/2008 | Park |
| 2009/0022922 A1 | 1/2009 | Park |

FOREIGN PATENT DOCUMENTS

| | | |
|---|---|---|
| EP | 0432911 | 6/1991 |
| EP | 0439734 | 8/1991 |
| EP | 0254307 | 12/1991 |
| EP | 1555110 | 7/2005 |
| EP | 1591469 | 11/2005 |
| GB | 1357904 | 6/1974 |
| JP | 62-011767 | 1/1987 |
| WO | WO 9600761 | 1/1996 |
| WO | WO 00/11073 | 3/2000 |
| WO | WO 01/48077 | 7/2001 |
| WO | WO 01/98405 | 12/2001 |

OTHER PUBLICATIONS

"Polyurethanes" Encyclopedia of Polymer Science & Engineering, vol. 13, Second Edition (Date Unknown). (pp. 274-278).

Webpage: "Dyneon™ Fluorothermoplastics" Accessed from 3M Manufacturing and Industrial and Downloaded May 8, 2003. (2 pages).

"Viton® Fluoroelastomer, A Product of DuPont Dow Elastomers", Technical Information, DuPont Dow Elastomers, Copyright 1988.

"AFLAS™ The Fluoroelastomer," Asahi Glass Company, Product Information, Apr. 11, 2003. (8 pages).

Webpage: Tetrafluoroethylene-Propylene Rubber, Date Unknown. (3 pages).

Schmiegel, Walter W., "A Review of Recent Progress in the Design and Reactions of Base-Resistant Fluoroelastomers", DuPont Dow Elastomers, IRC, Jul. 2003.

Moore, Michael J. "Silanes as Rubber-to-Metal Bonding Agents," 160th Meeting of the Rubber Division, American Chemical Society, Cleveland, Ohio, Paper No. 105, (2001). (17 pages).

Viton® Fluoroelastomer: Viton Extreme ETP-600S Technical Information (Formerly designated VTR-8710), DuPont Dow Elastomers (Date Unknown). (6 pages).

Material Safety Data Sheet "DuPont™ TPV 60A01 and 80A01", C.S. Wong, (Sep. 18, 2001). (9 pages).

DuPont "Grades for Customer Evaluation"—TPV 60A and TPV 80A. (3 pages).

Kim, K. et al. "Mold Release Additive Effects on Chlorine and Fluorine Rubber Compound" Struktol Company of America Paper No. 7, Presented at IRMC 2004 Meeting. Apr. 27-28, 2004. (18 pages).

Solvay Solexis: "Product Data Sheet: Tecnoflon FPA 1" available at www.solvaysolexis.com. Copyright 2003. (2 pages).

Sasol: Sasol Olefins and Surfactants available at www.sasoltechdata.com. (20 pages).

Electron Beam Curing of Polymeric Composites as an Enabling Technology for Advanced Manufacturing, E-Beam Services, Inc., presented at Internatl Composites Expo May 10-13, 1999.

Electron Beam Processing of Plastics: An Alternative to Chemical Additives, E-BEAM Services, Inc., Presented at 58th SPE Annual Technology Conf May 11, 2000.

Kenji Nagai Figure from "technical Issues and Counter Measures for FKM", Industrial Material, pp. 62-65.

* cited by examiner

METHODS FOR PREPARING ARTICLES FROM PROCESSABLE AND DIMENSIONALLY STABLE ELASTOMER COMPOSITIONS

BACKGROUND

The present technology relates to methods for preparing shaped rubber articles from processable and dimensionally stable rubber compositions. In particular, the technology also relates to rubber articles cured by irradiation and methods for production thereof.

Cured elastomers or rubbers have a variety of physical properties useful for molded article applications. Among these properties are a high degree of flexibility, elasticity, resistance to compression set and sealability. Particular applications in which rubber compositions may be used include, for example, seals, gaskets, o-rings and hoses.

Conventional elastomer compositions in an uncured or unvulcanized state are generally processable and may be shaped, for example, by extrusion or molding. Curing of shaped elastomer compositions may further be carried out under elevated temperature and pressure conditions suitable for crosslink formation. Since elastomer compositions are thermoset or crosslinked during the curing process, the elastomer material is no longer processable after being fully cured.

Thermoplastic materials also provide a variety of desirable properties. In comparison to elastomers, thermoplastics exhibit excellent processability and environmental stability, e.g. chemical resistance and solvent resistance. Thermoplastic materials further exhibit excellent green strength characteristics. Green strength, or the resistance of a composition to sag, is necessary for maintaining the dimensional stability of shaped articles after the fabrication process.

In view of the beneficial properties inherent in both elastomer and thermoplastic materials, it has been desirable to admix suitable materials when forming rubber compositions. When elastomer and thermoplastic materials are combined, the materials can be present as co-continuous phases. In general, however, the materials are present as a continuous phase (also known as a major phase) and a dispersed phase (also known as a noncontinuous, discrete, or minor phase). When elastomer is present as a continuous phase, the composition may exhibit excellent elasticity and sealability.

Although the final rubber articles prepared by curing such compositions provide the desired blend of properties, the uncured compositions exhibit poor green strength. The poor green strength is believed to be due to the high elastomer content of such compositions. As a result, shaped but uncured elastomer compositions have a tendency to slowly deform under gravitational stress in a phenomenon known as creep. At room temperature, the creep phenomena may be called cold flow. Higher levels of thermoplastic, which do not flow or creep substantially at room temperature, are also not usable due to undesirable compression set and flexibility of final cured products.

There is a continuing need for a polymer composition combining the rubber properties of elastomer compositions with the processability and environmental stability of thermoplastic compositions. In particular, it is desirable to produce a processable elastomer composition having a green strength sufficient to maintain the dimensional stability of shaped uncured compositions prior to curing, and cured rubber articles having elastomeric properties and improved environmental stability.

SUMMARY OF THE INVENTION

The present technology provides methods of admixing at least one thermoplastic material, at least one elastomer material, and at least two curatives. The elastomer material is preferably present in an amount greater than about 65% by weight based on the total weight of the thermoplastic and elastomer materials present in the admixture.

The compositions of the present technology preferably have a green strength sufficient to inhibit substantial creep or sag of the composition, whereby dimensional stability is provided to the composition prior to curing. Sufficient green strength may be achieved in a variety of ways. One method contemplated is partial dynamic vulcanization of the at least one elastomer material in the presence of the at least two curatives, wherein crosslinks are not contributed by some of the curatives during the partial dynamic vulcanization process.

Sufficient green strength is also provided in various embodiments by adding at least one high performance reinforcing filler to the composition. Suitable high performance reinforcing fillers are in the form of fiber, pulp, and/or granulated particles, and include high performance thermoplastics. High performance reinforcing fillers include, for example, polyetherketone, polysulfone, liquid crystalline polymer, polypthalamide, aramid, ultra-high molecular weight polyethylene, and carbon nano-fiber.

A sufficient dimensional stability is also provided in various embodiments by admixing at least one elastomer comprising (i) a first curable elastomer and (ii) a second curable elastomer having a cure chemistry different than the first curable elastomer. At least one of the elastomer materials is then fractionally cured by reacting at least one curative with at least one of elastomer materials (i) or (ii). The fractional curing provides an increase in green strength, further supporting dimensional stability of the rubber composition prior to final curing. It is further contemplated that the use of elastomer materials having different cure chemistries provides improved physical properties, e.g. tensile strength, modulus, elongation, and improved chemical properties, e.g. solvent resistance, in comparison to compositions having an elastomer with only one type of cure chemistry.

In various embodiments, the methods of the present technology further comprise shaping of the processable elastomer composition having dimensional stability. Shaping may be performed using any process suitable for conventional processing of uncured elastomer compositions including, for example, injection molding, compression molding, transfer molding, blow molding, single layer extrusion, multi-layer extrusion, insert molding, and calendering. The compositions of the present technology may be formed into a variety of shapes, including rubber sealing members such as o-rings and gaskets, and shaped rubber articles such as hoses.

Final- and/or post-curing of the shaped elastomer compositions may include curing by irradiation. The irradiation is sufficient to create free radicals in both the thermoplastic and elastomer phases for formation of crosslinks. Crosslinks formation includes crosslinks within the elastomer and thermoplastics phases and interlinks between the elastomer and thermoplastics phases. Although a number of forms of radiation may be used to cure the elastomer composition of the disclosure, a suitable form of irradiation includes electron beam irradiation.

Isolated rubber compositions are also contemplated, wherein the compositions are prepared according to the methods of the present technology. The compositions are isolated in that they are not actively being processed and yet have the features described herein. Such compositions are processable, meaning that the compositions have a Mooney viscosity suitable for processing the compositions in conventional rubber processing equipment. The compositions also are dimensionally stable, meaning that the compositions after shaping have a green strength sufficient to provide less than about 1% dimensional change after a 24-hour aging cycle at room temperature.

DESCRIPTION

The following description is merely exemplary in nature and is not intended to limit the present disclosure, application, or uses. The following definitions and non-limiting guidelines must be considered in reviewing the disclosure set forth herein.

The headings (such as "Introduction" and "Summary") and sub-headings used herein are intended only for general organization of topics within this description, and are not intended to limit this description or any aspect thereof. In particular, subject matter disclosed in the "Introduction" may include aspects of technology within the scope of this description, and may not constitute a recitation of prior art. Subject matter disclosed in the "Summary" is not an exhaustive or complete disclosure of the entire scope of this description or any embodiments thereof.

The citation of references herein does not constitute an admission that those references are prior art or have any relevance to the patentability of this description disclosed herein. All references cited in the Description section of this specification are hereby incorporated by reference in their entirety.

The description and specific examples, while indicating embodiments of this description, are intended for purposes of illustration only and are not intended to limit the scope of this description. Moreover, recitation of multiple embodiments having stated features is not intended to exclude other embodiments having additional features, or other embodiments incorporating different combinations of the stated of features.

As used herein, the words "preferred" and "preferably" refer to embodiments of this description that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of this description.

As used herein, the word "include," and its variants, is intended to be non-limiting, such that recitation of items in a list is not to the exclusion of other like items that may also be useful in the materials, compositions, devices, and methods of this description.

The present technology provides methods for preparing a shaped rubber article. Methods comprise first admixing at least one thermoplastic material, at least one elastomer material, and at least two curatives, wherein the elastomer material is present in an amount sufficient for the elastomer to constitute the continuous phase of the composition.

Suitable thermoplastic materials include any thermoplastic that may be dispersed in an elastomer material. The thermoplastic material dispersed in the matrix may include at least one component that is non-fluorine containing thermoplastic polymer. In one aspect, a thermoplastic material is one the melt viscosity of which can be measured, such as by ASTM D-1238 or ASTM D-2116, at a temperature above its melting point.

The thermoplastic material may be selected to provide enhanced properties of the rubber/thermoplastic combination at elevated temperatures, preferably above 100° C. and more preferably at about 150° C. and higher. Such thermoplastics include those that maintain physical properties, such as at least one of tensile strength, modulus, and elongation at break to an acceptable degree at the elevated temperature. In one embodiment, the thermoplastics possess physical properties at the elevated temperatures that are superior, i.e. higher tensile strength, higher modulus, and/or higher elongation at break, to those of the cured elastomer at a comparable temperature.

The thermoplastic material may be a thermoplastic elastomer. Thermoplastic elastomers have some physical properties of rubber, such as softness, flexibility and resilience, but may be processed like thermoplastics. A transition from a melt to a solid rubber-like composition occurs fairly rapidly with thermoplastic elastomers upon cooling. This is in contrast to conventional elastomers, which tend to harden slowly upon heating. Thermoplastic elastomers may be processed on conventional plastic equipment such as injection molders and extruders.

Thermoplastic elastomers have a multi-phase structure, wherein the phases are generally intimately mixed. In many cases, the phases are held together by graft or block copolymerization. At least one phase is made of a material that is hard at room temperature but fluid upon heating. Another phase is a softer material that is rubber like at room temperature.

Some thermoplastic elastomers have an A-B-A block copolymer structure, where A represents hard segments and B is a soft segment. Because most polymeric material tend to be incompatible with one another, the hard and soft segments of thermoplastic elastomers tend to associate with one another to form hard and soft phases. For example, the hard segments tend to form spherical regions or domains dispersed in a continuous elastomer phase. At room temperature, the domains are hard and act as physical crosslinks tying together elastomeric chains in a 3-D network. The domains tend to lose strength when the material is heated or dissolved in a solvent. Non-limiting examples of A-B-A type thermoplastic elastomers include polystyrene/polysiloxane/polystyrene, polystyrene/polyethylene-co-butylene/polystyrene, polystyrene/polybutadiene polystyrene, polystyrene/polyisoprene/polystyrene, poly-α-methyl styrene/polybutadiene/poly-α-methyl styrene, poly-α-methyl styrene/polyisoprene/poly-α-methyl styrene, and polyethylene/polyethylene-co-butylene/polyethylene.

Other thermoplastic elastomers have a repeating structure represented by $(A-B)_n$, where A represents the hard segments and B the soft segments as described above. Non-limiting examples of thermoplastic elastomers having a $(A-B)_n$ repeating structure include polyamide/polyether, polysulfone/polydimethylsiloxane, polyurethane/polyester, polyurethane/polyether, polyester/polyether, polycarbonate/polydimethylsiloxane, and polycarbonate/polyether. Among the most common commercially available thermoplastic elastomers are those that contain polystyrene as the hard segment. Triblock elastomers are available with polystyrene as the hard segment and either polybutadiene, polyisoprene, or polyethylene-co-butylene as the soft segment. Similarly, styrene butadiene repeating co-polymers are commercially available, as well as polystyrene/polyisoprene repeating polymers.

In a particularly illustrative embodiment, a thermoplastic elastomer is used that has alternating blocks of polyamide and polyether. Such materials are commercially available, for example, from Atofina under the Pebax® trade name. The polyamide blocks may be derived from a copolymer of a diacid component and a diamine component, or may be prepared by homopolymerization of a cyclic lactam. The polyether block is generally derived from homo- or copolymers of cyclic ethers such as ethylene oxide, propylene oxide, and tetrahydrofuran.

The thermoplastic polymeric material may also be selected from solid, generally high molecular weight, plastic materials. Preferably, the materials are crystalline or semi-crystalline polymers, and more preferably have a crystallinity of at least 25 percent as measured by differential scanning calorimetry. Amorphous polymers with a suitably high glass transition temperature are also acceptable as the thermoplastic polymeric material. The thermoplastic also preferably has a melt temperature or glass transition temperature in the range from about 80° C. to about 350° C., but the melt temperature should generally be lower than the decomposition temperature of the thermoplastic vulcanizate.

Non-limiting examples of thermoplastic materials include polyolefins, polyesters, nylons, polycarbonates, styrene-acrylonitrile copolymers, polyethylene terephthalate, polybutylene terephthalate, polyamides, polystyrene, polystyrene derivatives, polyphenylene oxide, polyoxymethylene, and fluorine-containing thermoplastics.

Polyolefins are formed by polymerizing $\alpha$-olefins such as, but not limited to, ethylene, propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene or ethylene or propylene with another $\alpha$-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. These homopolymers and copolymers, and blends of them, may be incorporated as the thermoplastic polymeric material of the technology.

Polyester thermoplastics contain repeating ester linking units in the polymer backbone. In one embodiment, they contain repeating units derived from low molecular weight diols and low molecular weight aromatic diacids. Non-limiting examples include the commercially available grades of polyethylene terephthalate and polybutylene terephthalate. Alternatively, the polyesters may be based on aliphatic diols and aliphatic diacids. Exemplary here are copolymers of ethylene glycol or butanediol with adipic acid. In another embodiment, the thermoplastic polyesters are polylactones, prepared by polymerizing a monomer containing both hydroxyl and carboxyl functionality. Polycaprolactone is a non-limiting example of this class of thermoplastic polyester.

Polyamide thermoplastics contain repeating amide linkages in the polymer backbone. In one embodiment, the polyamides contain repeating units derived from diamine and diacid monomers such as the well known nylon 66, a polymer of hexamethylene diamine and adipic acid. Other nylons have structures resulting from varying the size of the diamine and diacid components. Non-limiting examples include nylon 610, nylon 612, nylon 46, and nylon 6/66 copolymer. In another embodiment, the polyamides have a structure resulting from polymerizing a monomer with both amine and carboxyl functionality. Non-limiting examples include nylon 6 (polycaprolactam), nylon 11, and nylon 12.

Other polyamides made from diamine and diacid components include the high temperature aromatic polyamides containing repeating units derived from diamines and aromatic diacids such as terephthalic acid. Commercially available examples of these include PA6T (a copolymer of hexanediamine and terephthalic acid), and PA9T (a copolymer of nonanediamine and terephthalic acid), sold by Kuraray under the Genestar trade name. For some applications, the melting point of some aromatic polyamides may be higher than optimum for thermoplastic processing. In such cases, the melting point may be lowered by preparing appropriate copolymers. In a non-limiting example, in the case of PA6T which has a melting temperature of about 370° C., it is possible to in effect lower the melting point to below a moldable temperature of 320° C. by including an effective amount of a non-aromatic diacid such as adipic acid when making the polymer.

In another preferred embodiment, an aromatic polyamide is used based on a copolymer of an aromatic diacid such as terephthalic acid and a diamine containing greater than 6 carbon atoms, preferably containing 9 carbon atoms or more. The upper limit of the length of the carbon chain of the diamine is limited from a practical standpoint by the availability of suitable monomers for the polymer synthesis. As a rule, suitable diamines include those having from 7 to 20 carbon atoms, preferably in the range of 9 to 15 carbons, and more preferably in the range from 9 to 12 carbons. Preferred embodiments include $C_9$, $C_{10}$, and $C_{11}$, diamine based aromatic polyamides. It is believed that such aromatic polyamides exhibit an increase level of solvent resistance based on the oleophilic nature of the carbon chain having greater than 6 carbons. If desired to reduce the melting point below a preferred molding temperature (typically 320° C. or lower), the aromatic polyamide based on diamines of greater than 6 carbons may contain an effective amount of a non-aromatic diacid, as discussed above with the aromatic polyamide based on a 6 carbon diamine. Such effective amount of diacid should be enough to lower the melting point into a desired molding temperature range, without unacceptably affecting the desired solvent resistance properties.

Other non-limiting examples of high temperature thermoplastics include polyphenylene sulfide, liquid crystal polymers, and high temperature polyimides. Liquid crystal polymers are based chemically on linear polymers containing repeating linear aromatic rings. Because of the aromatic structure, the materials form domains in the nematic melt state with a characteristic spacing detectable by x-ray diffraction methods. Examples of materials include copolymers of hydroxybenzoic acid, or copolymers of ethylene glycol and linear aromatic diesters such as terephthalic acid or naphthalene dicarboxylic acid.

High temperature thermoplastic polyimides include the polymeric reaction products of aromatic dianhydrides and aromatic diamines. They are commercially available from a number of sources. Exemplary is a copolymer of 1,4-benzenediamine and 1,2,4,5-benzenetetracarboxylic acid dianhydride.

In an illustrative embodiment, the matrix comprises at least one non-fluorine containing thermoplastic, such as those described above. Thermoplastic fluorine-containing polymers may be selected from a wide range of polymers and commercial products. The polymers are melt processable—they soften and flow when heated, and can be readily processed in thermoplastic techniques such as injection molding, extrusion, compression molding, and blow molding.

The thermoplastic polymers may be fully fluorinated or partially fluorinated. Fully fluorinated thermoplastic polymers include copolymers of tetrafluoroethylene and perfluoroalkyl vinyl ethers. The perfluoroalkyl group is preferably of 1 to 6 carbon atoms. Other examples of copolymers are PFA (copolymer of TFE and perfluoropropyl vinyl ether) and MFA (copolymer of TFE and perfluoromethyl vinyl ether). Other examples of fully fluorinated thermoplastic polymers include copolymers of TFE with perfluoroolefins of 3 to 8 carbon atoms. Non-limiting examples include FEP (copolymer of TFE and hexafluoropropylene).

Partially fluorinated thermoplastic polymers include E-TFE (copolymer of ethylene and TFE), E-CTFE (copolymer of ethylene and chlorotrifluoroethylene), and PVDF (polyvinylidene fluoride). A number of thermoplastic copolymers of vinylidene fluoride are also suitable thermoplastic polymers for use in the technology. These include, without limitation, copolymers with perfluoroolefins such as hexafluoropropylene, and copolymers with chlorotrifluoroethylene.

Thermoplastic terpolymers may also be used. These include thermoplastic terpolymers of TFE, HFP, and vinylidene fluoride. These and other fluorine-containing thermoplastic materials are commercially available. Suppliers include Dyneon (3M), Daikin, Asahi Glass Fluoroplastics, Solvay/Ausimont and DuPont.

The rubber compositions of the present technology include one or more elastomer materials. Suitable elastomer materials include, as non-limiting examples, polyacrylic rubber (ACM), ethylene acrylic rubber (AEM), acrylonitrile butadiene rubber (NBR), hydrogenated acrylonitrile butadiene rubber (HNBR), silicone rubber (SI), polyurethane rubber (PU), natural rubber (NR), and styrene butadiene rubber (SBR), polybutadiene rubber (BR), fluorocarbon elastomer (FCE) and combinations thereof.

In an illustrative embodiment, the elastomer material is a fluorocarbon elastomer (FCE). Typically, the FCE is a polymeric material containing repeating units derived from tetrafluoroethylene and from at least one $C_{2-4}$ olefin. In another embodiment, the FCE contains repeating units derived from hexafluoropropylene, vinylidene difluoride, and optionally tetrafluoroethylene or other fluorine-containing monomer. In yet another embodiment, the FCE contains repeating units derived from tetrafluoroethylene, perfluorovinylether, and optional other monomers.

Particular fluorocarbon elastomers include commercially available copolymers of one or more fluorine containing monomers, chiefly vinylidene fluoride (VDF), hexafluoropropylene (HFP), tetrafluoroethylene (TFE), and perfluorovinyl ethers (PFVE). Preferred PFVE include those with a $C_{1-8}$ perfluoroalkyl group, preferably perfluoroalkyl groups with 1 to 6 carbons, and particularly perfluoromethyl vinyl ether and perfluoropropyl vinyl ether. In addition, the copolymers may also contain repeating units derived from olefins such as ethylene (Et) and propylene (Pr). The copolymers may also contain relatively minor amounts of cure site monomers (CSM), discussed further below.

Further copolymer fluorocarbon elastomers have the elastomer designation of VDF/HFP, VDF/HFP/CSM, VDF/HFP/TFE, VDF/HFP/TFE/CSM, VDF/PFVE/TFE/CSM, TFE/Pr, TFE/Pr/VDF, TFE/Et/PFVE/VDF/CSM, TFE/Et/PFVE/CSM and TFE/PFVE/CSM. The elastomer designation gives the monomers from which the elastomer gums are synthesized. The elastomer gums have viscosities that give a Mooney viscosity in the range generally of 15-160 (ML1+10, large rotor at 121° C.), which can be selected for a combination of flow and physical properties. Elastomer suppliers include Dyneon (3M), Asahi Glass Fluoropol.

The elastomeric material, in particular aspects of the technology, may be described as a copolymer of tetrafluoroethylene and at least one $C_{2-4}$ olefin. As such, the elastomeric material comprises repeating units derived from tetrafluoroethylene and at least one $C_{2-4}$ olefin. Optionally, the elastomeric material contains repeating units derived from one or more additional fluorine-containing monomers.

In yet another embodiment, the elastomeric material comprises repeating units derived from 10-90 mole % tetrafluoroethylene, 10-90 mole % $C_{2-4}$ olefin, and up to 30 mole % of one or more additional fluorine-containing monomers. Typically, the repeating units are derived from 25-90 mole % tetrafluoroethylene and 10-75 mole % $C_{2-4}$ olefin. In another illustrative embodiment, the repeating units are derived from 45-65 mole % tetrafluoroethylene and 20-55 mole % $C_{2-4}$ olefin.

The molar ratio of tetrafluoroethylene units to $C_{2-4}$ olefin repeating units, in particular instances, is from 60:40 to 40:60. The elastomeric material may also comprise alternating units of $C_{2-4}$ olefins and tetrafluoroethylene. In such polymers the molar ratio of tetrafluoroethylene to $C_{2-4}$ olefin is approximately 50:50.

In a further embodiment, the elastomeric materials are provided as block copolymers having an A-B-A structure, wherein A represents a block of poly-tetrafluoroethylene and B represents a block of polyolefin. A well known $C_{2-4}$ olefin is propylene. Elastomeric materials based on copolymers of tetrafluoroethylene and propylene are commercially available, for example, from Asahi under the Aflas® trade name.

An additional monomer in the vulcanized elastomeric material is vinylidene difluoride. Other fluorine-containing monomers that may be used in the elastomeric materials of the technology include without limitation, perfluoroalkyl vinyl compounds, perfluoroalkyl vinylidene compounds, and perfluoroalkoxy vinyl compounds. Hexafluoropropylene (HFP) is an example of perfluoroalkyl vinyl monomer. Perfluoromethyl vinyl ether is an example of a preferred perfluoroalkoxy vinyl monomer. For example, rubbers based on copolymers of tetrafluoroethylene, ethylene, and perfluoromethyl vinyl ether are commercially available from Dupont under the Viton® ETP trade name.

In another embodiment, the elastomeric materials are curable fluorocarbon elastomers containing repeating units derived from fluoromonomers vinylidene fluoride (VDF) and hexafluoropropylene (HFP). In some embodiments, the elastomers further contain repeating units derived from tetrafluoroethylene. The elastomeric materials may be cured or crosslinked as described below to provide cured materials with rubber-like properties.

It is further contemplated that the elastomeric material is made of copolymers of VDF and HFP, or of terpolymers of VDF, HFP, and tetrafluoroethylene (TFE), with optional cure site monomers. In various preferred embodiments, they contain about 66to about 70% by weight fluorine. The elastomers are commercially available, and are exemplified by the Viton® A, Viton® B, and Viton® F series of elastomers from DuPont Dow Elastomers. Grades are commercially available containing the gum polymers alone, or as curative-containing pre-compounds.

Additionally, the elastomers can be described chemically as copolymers of TFE and PFVE, optionally as a terpolymer with VDF. The elastomer may further contain repeating units derived from cure site monomers.

Fluorocarbon elastomeric materials used to make the processable rubber compositions of the technology can be prepared by free radical emulsion polymerization of a monomer mixture containing the desired molar ratios of starting monomers. Initiators are typically organic or inorganic peroxide compounds, and the emulsifying agent is typically a fluorinated acid soap. The molecular weight of the polymer formed can be controlled by the relative amounts of initiators used compared to the monomer level and the choice of transfer agent if any. Typical transfer agents include carbon tetrachloride, methanol, and acetone. The emulsion polymerization may be conducted under batch or continuous conditions. Such fluoroelastomers are commercially available as noted above.

The fluorocarbon elastomers may also contain up to 5 mole % and preferably up to 3 mole % of repeating units derived from so-called cure site monomers (CSM) that provide cure sites for vulcanization as discussed below. Such fluorocarbon elastomers are generally classified as peroxide-curable. In one embodiment, the cure site repeating units are derived from bromine-containing olefin monomers. If used, the repeating units of a bromine-containing olefin may be present in a level to provide at least about 0.05% bromine in the polymer, preferably 0.3% bromine or more. In a preferred embodiment, the total weight of bromine in the polymer is 1.5 wt. % or less.

Bromine-containing olefin monomers useful to provide cure sites for fluoropolymers are disclosed for example in U.S. Pat. No. 4,035,565, Apotheker et al., "Fluoropolymer Containing a Small Amount of Bromine-Containing Olefin Units," issued Jul. 12, 1977. Non-limiting examples of bromine-containing monomers include bromotrifluoroethylene and 4-bromo-3,3,4,4-tetrafluoro-1-butene. Additional non-limiting examples include vinyl bromide, 1-bromo-2,2-difluoroethylene, perfluoroalkyl bromide, 4-bromo-1,1,2-trifluorobutene, 4-bromo-1,1,3,3,4,4-hexafluorobutene, 4-bromo-3-chloro-1,1,3,4,4,-pentafluorobutene, 6-bromo-5,5,6,6-tetrafluorohexene, 4-bromoperfluorobutene-1, and 3,3-difluoroallyl bromide. As noted above, it is usually preferred that enough of the bromo-olefin repeating units be present to provide from about 0.3-1.5 wt. % bromine in the copolymer.

Other cure site monomers may be used that introduce low levels, preferably less than or equal to about 5 mole %, more preferably less than or equal to about 3 mole %, of functional groups such as epoxy, carboxylic acid, carboxylic acid halide, carboxylic ester, carboxylate salts, sulfonic acid groups, sulfonic acid alkyl esters, and sulfonic acid salts. Such monomers and cure chemistry are described for example in U.S. Pat. No. 5,354,811, Kamiya et al., "Fluorine-Containing Thermoplastic Elastomer Composition and Process for its Production," issued Oct. 11, 1994.

Peroxide curable fluoroelastomer having cure site monomers are commercially available, for example, under the trade name Tecnoflon from Solvay Solexis.

Although the amount of elastomer may be dependent upon the elastomer and thermoplastic materials chosen for admixing, a suitable amount of elastomer may be an amount greater than about 65% by weight based on the total weight of the elastomer and thermoplastic materials in the composition. In another embodiment, a suitable elastomer amount may be an amount greater than about 80% by weight. In a further embodiment, the elastomer may be present in an amount greater than about 95% by weight. It should be further understood that, depending on the particular physical and chemical properties desired by the final cured composition, the elastomer may be present in the rubber composition at any level from about 65% up to 100% by weight, based on the total weight of the elastomer and thermoplastic materials in the composition.

In various embodiments, the elastomers can be cured using only one type of cure chemistry, e.g. peroxide-curable elastomers cured with peroxide curatives. It should also be understood, however, that elastomers may be curable with more than one type of cure chemistry. As a non-limiting example, such elastomers include bisphenol-curable elastomers that may be crosslinked with polyol curatives as well as peroxide curatives.

Curatives of the technology may include sulfur, sulfur donors, diamines, peroxides, polyols, and combinations thereof.

Sulfur and/or sulfur donors are generally used in the art to cure elastomers having points of unsaturation located along the polymer backbone or on pendant groups of the polymer chain. For example, sulfur may be used to vulcanize an elastomer having a diene monomer unit. Suitable sulfur and/or sulfur donors include any of those known in the art for curing rubber compositions. Such sulfur and/or sulfur donors include, as non-limiting examples, elemental sulfur, insoluble sulfur, 4,4'-dithiodimorpholine (DTDM), dipentamethylenethiuram tetrasulfide (DPTT), tetraethylthiuram disulfide (TETD), and tetramethylthiuram disulfide (TMTD). Such curatives are commercial available, for example from Flexsys America, L.P.

Diamine curatives have been known since the 1950's and were among the first curatives developed for fluroelastomers. Diamine curatives are relatively slow curing but offer advantages in several areas. Diamine curatives are generally used with an acid acceptor. Such curatives are commercially available, for example as Diak-1 from DuPont Dow Elastomers.

Peroxide curatives are organic peroxides, and in illustrative embodiments dialkyl peroxides. In general, organic peroxide may be selected to function as a curing agent for the composition in the presence of the other ingredients. Organic peroxide may function under the temperatures to be used in the curing operation without causing any harmful amount of curing during mixing or other processing operations prior to curing. Dialkyl peroxide which decomposes at a temperature above 49° C. is especially preferred when the composition is to be subjected to processing at elevated temperatures before it is cured. In many cases one will prefer to use di-tertiarybutyl peroxide having a tertiary carbon atom attached to a peroxy oxygen. Non-limiting examples include 2,5-dimethyl-2,5-di(tert-butylperoxy)-3-hexyne; 2,5-dimethyl-2,5-di(tert-butylperoxy) hexane; and 1,3-bis-(t-butylperoxyisopropyl) benzene. Other non-limiting examples of peroxide curative agent include dicumyl peroxide, dibenzoyl peroxide, tertiary butyl perbenzoate, di[1,3-dimethyl-3-(t-butylperoxy)butyl] carbonate, and the like. As a non-limiting example, an acceptable organic peroxide is dicumyl peroxide, commercially available under the trade name Luperco available commercially from E.I. duPont and de Nemeurs.

One or more crosslinking or olefinic co-agents may be combined with the peroxide. Examples include triallylcyanurate; triallylisocyanurates; tri(methallyl) -isocyanurate; tris (diallylamine)-s-triazine, triallyl phosphite; N,N-diallyl acrylamide; hexaallyl phosphoramide; N,N,N',N'-tetraallyl terephthalamide; N,N,N',N'-tetraallyl malonamide; trivinyl isocyanurate; 2,4,6-trivinyl methyltrisiloxane; and tri(5-norbornene-2-methylene) cyanurate. In one particular embodiment of the technology, the olefinic co-agentis triallyisocyanurate (TAIC).

The polyol curatives may be any of those polyhydroxy compounds known in the art to function as a crosslinking agent or co-curative for fluoroelastomers. Preferred polyols include aromatic polyhydroxy compounds, aliphatic polyhydroxy compounds, and phenol resins. Representative aromatic polyhydroxy compounds include any one of the following: di-, tri-, and tetrahydroxybenzenes, -naphthalenes, and -anthracenes, and bisphenols. In one embodiment of the present technology, the polyol crosslinking agent is a bisphenol curative, particularly hexafluoroisopropylidene-bis(4-hydroxybenzene), also known as Bisphenol AF. Such a curative is commercially available, for example, from DuPont Polymer Specialties.

Aliphatic polyhydroxy compounds may also be used as a polyol curative. Examples include fluoroaliphatic diols, e.g. 1,1,6,6-tetrahydrooctafluorohexanediol, and others such as those described in U.S. Pat. No. 4,358,559, Holcomb et al., "Tacky Fluoroelastomer Compositions," issued Nov. 9, 1982 and references cited therein. Derivatives of polyhydroxy compounds can also be used such as those described in U.S. Pat. No. 4,446,270, Guenthner et al., "Vulcanizing Fluorocarbon Elastomers With One or a Mixture of Aromatic Compounds Having Hydroxyl and Oxyallyl Groups," issued May 1, 2984, and include, for example, 2-(4-allyloxyphenyl)-2-(4-hydroxyphenyl)propane. Mixtures of two or more of the polyhydroxy compounds can be used.

Phenol resins capable of crosslinking a rubber polymer can also be employed as the polyol curative. Any reference to phenol resin may include mixtures of these resins. See, for example, U.S. Pat. No. 2,972,600, Braidwood, "Substituted Phenols, issued Feb. 21, 1961 and U.S. Pat. No. 3,287,440, Giller, "Process for the Cross-Linking of Unsaturated Copolymers and Ethylene-Propylene Terpolymers," issued Nov. 22, 1966. Phenolic resins can be used to obtain the desired level of cure without the use of other curatives or curing agents.

Phenol resin curatives can be made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols typically contain 1 to about 10 carbon atoms. Dimethylolphenols or phenolic resins, substituted in para-positions with alkyl groups containing 1 to about 10 carbon atoms, are preferred. Useful commercially available phenol resins include alkylphenol-formaldehyde resin, and bromomethylated alkylphenol-formaldehyde resins.

Polyhydroxy curatives, such as polyol curatives, are used in combination with certain onium salts that act as catalysts or vulcanization accelerators. Suitable onium salts are described, for example, in U.S. Pat. No. 4,233,421, Worm, "Fluoroelastomer Composition Containing Sulfonium Curing Agents," issued Nov. 11, 1980; U.S. Pat. No. 4,912,171, Grootaert et al., "Fluoroelastomer Curing Process With Phosphonium Compound," issued Mar. 27, 1990; and U.S. Pat. No. 5,262,490, Kolb et al., "Fluoroelastomer Composition With Organo-Onium Compounds," issued Nov. 16, 1993. Non-limiting examples include triphenylbenzyl phosphonium chloride, tributyl alkyl phosphonium chloride, tributyl benzyl ammonium chloride, tetrabutyl ammonium bromide, and triarylsulfonium chloride.

It should be further understood that the curatives in the compositions of the present technology can include a single curative type or more than one curative type. For example, a composition may comprise only a peroxide curative for crosslinking with a peroxide-curable elastomer. In an alternative embodiment, a composition may comprise both a peroxide curative and a polyol curative, wherein the peroxide curative reacts only with the peroxide-curable elastomer and the polyol curative reacts with the polyol-curable elastomer. In some instances, particularly when the peroxide-curable elastomer has a vinylidene fluoride (VDF) unit, the peroxide-curable elastomer also is able to react with the polyol curative.

Specific curatives may be chosen by one of skill in the art so as to allow for simultaneous curing, i.e. crosslinking of both cure chemistry types under the same conditions. Alternatively, the curatives may be selected to provide fractional curing, i.e. crosslinking of only one of the cure chemistry types under a particular set of conditions. The onset of crosslinking by one curative and not another is controllable by temperature. As a non-limiting example, a peroxide curative may be chosen that reacts at a lower temperature than a polyol curative also chosen for the composition.

In addition to the at least one thermoplastic material, the at least one elastomer material, and the at least one curative, the compositions of the present technology also include other ingredients conventionally used in elastomer compositions. As non-limiting examples, such ingredients include plasticizers, extender oils, synthetic processing oils, stabilizers, processing aids, curing accelerators, fillers, pigments, adhesives, tackifiers, waxes, and combinations thereof.

The processing oil selected is typically consistent with oil ordinarily used in conjunction with the specific elastomer(s) and thermoplastic(s) present in the composition. The extender oils may include, but are not limited to, aromatic, naphthenic, and paraffinic extender oils. Preferred synthetic processing oils include polylimer α-olefins. The extender oils may also include organic esters, alkyl ethers, or combinations thereof.

The addition of certain low to medium molecular weight organic esters and alkyl ether esters to the compositions of the technology is known to lower the Tg of the overall composition and improve low temperatures properties, particularly flexibility and strength. These organic esters and alkyl ether esters generally have a molecular weight that is generally less than about 10,000. Particularly suitable esters include monomeric and oligomeric materials having an average molecular weight below about 2000, and preferably below about 600. In one embodiment, the esters may be either aliphatic mono- or diesters or alternatively oligomeric aliphatic esters or alkyl ether esters.

A wide variety of processing aids may be used, including plasticizers and mold release agents. Non-limiting examples of processing aids include Caranuba wax, phthalate ester plasticizers such as dioctylphthalate (DOP) and dibutylphthalate silicate (DBS), fatty acid salts such zinc stearate and sodium stearate, polyethylene wax, and keramide. In some embodiments, high temperature processing aids are preferred. Such include, without limitation, linear fatty alcohols such as blends of $C_{10}$-$C_{28}$ alcohols, organosilicones, and functionalized perfluoropolyethers. In some embodiments, the compositions contain about 1 to about 15% by weight processing aids, preferably about 5 to about 10% by weight.

Acid acceptor compounds are commonly used as curing accelerators or curing stabilizers in the compositions of the technology. Preferred acid acceptor compounds include oxides and hydroxides of divalent metals. Non-limiting examples include $Ca(OH)_2$, MgO, CaO, and ZnO.

The elastomer composition may also include conventional fillers, including both organic and inorganic fillers such as, barium sulfate, zinc sulfide, carbon black, silica, titanium dioxide, clay, talc, fiber glass, and fumed silica. Non-limiting examples of carbon black fillers include SAF black, HAF black, SRP black and Austin black. Carbon black improves tensile strength and extender oil can improve processability, the resistance to oil swell, heat stability, hysteresis, cost, and permanent set. In a particular embodiment, fillers such as carbon block may make up to about 40% by weight of the total weight of the compositions of the technology. In some instances, the compositions comprise 1 to 40 weight % of filler. In other embodiments, the filler makes up 10 to 25 weight % of the compositions.

Additionally, high performance reinforcing fillers (HPRFs) may be used in the elastomer composition according to the present technology. High performance reinforcing fillers significantly strengthen the polymer matrix and enhance green strength of uncured rubber compositions. It is generally known that high performance fillers exhibit high strength and melting temperatures and that many high performance fillers do not melt at conventional rubber processing temperatures. Such fillers include, as non-limiting examples, polyetherketone (PEEK), polysulfone (PS, PES, PPS), liquid crystalline polymer (LCP), polyphthalamide (PPA), polyphenylamide (Aramid), ultra-high molecular weight polyethylene (UHMWPE), and carbon nano-fiber.

High performance reinforcing fillers are available in a variety of forms, including fiber, pulp, flakes, and/or granulated particles. A particularly suitable high performance reinforcing filler of the present technology is aramid pulp, available under the trade names Kevlar and Nomex from E.I. du Pont de Nemours and Company.

High performance reinforcing fillers are present in the elastomer composition of the present technology in an amount from about 0.1 phr to about 80 phr, particular from about 1 phr to about 50 phr, and in particular embodiments from about 2 phr to about 10 phr. In one embodiment of the present technology, Kevlar pulp is present in the elastomer composition in an amount of about 5 phr.

It is contemplated that methods may further comprise partially dynamically curing the at least one elastomer material in the presence of at least one curative to form a homogenous rubber composition comprising a thermoplastic dispersed phase in a continuous elastomer phase. Dynamic vulcanization refers to a type of vulcanization or curing process for an elastomer having a thermoplastic dispersed therein, wherein the elastomer is crosslinked under conditions of sufficiently high shear. Generally, the compositions are dynamically cured at a temperature above the melting point of the thermoplastic component. The elastomer component is thus crosslinked and the thermoplastic simultaneously dispersed within the elastomer matrix.

The terms "partial" or "partially" with respect to dynamic vulcanization or curing mean that the amount of crosslinks present in the partially dynamically cured composition is greater than that present in an uncured composition but less than the amount exhibited by a thermoset or substantially fully cured composition. Furthermore, the term means that the amount of crosslinking is less than an amount which would prevent processing of the elastomer composition by conventional rubber processing equipment. Thus, partially dynamically cured compositions according to the present technology have some crosslinks but are still processable as uncured rubber compositions. It should be recognized that the extent of the crosslinking may be controlled by adjusting, individually or in combination, the mixing time, temperature, and/or levels of curatives and/or related accelerators and co-agents in the elastomer composition. In a particular embodiment of the disclosure, the extent of crosslinking is controlled by selectively reacting curatives in a composition having two or more curative types.

Partial dynamic vulcanization may be effected by applying mechanical energy to mix the elastomer and thermoplastic materials at elevated temperature in the presence of the at least one curative. Mechanical energy may be applied through use of conventional mixing equipment such as roll mills, Moriyama mixers, Banbury mixers, Brabender mixers, continuous mixers, mixing extruders such as single and twin-screw extruders, and the like.

Heating and mixing or mastication at conventional vulcanization temperatures is generally adequate for the partial dynamic vuclcanization of the technology. However, one of ordinary skill should recognize that shorter mixing or mastication times and/or lower mixing temperatures may be desired to prevent crosslinking to an extent that prohibits further processing of the composition. A suitable range of vulcanization temperature is from about the melting temperature of the thermoplastic material (typically 120° C.) to about 300° C. or more. Typically, the range is from about 150° C. to about 250° C. A particular range of vulcanization temperatures is from about 180° C. to about 220° C. Mixing may continue without interruption as long as the composition is still processable by conventional rubber processing techniques. Additionally, one of ordinary skill in the art should recognize that appreciable curing can occur after mixing has stopped and that this additional curing should be taken into account to prevent the composition from becoming unprocessable.

In various embodiments, an admixture comprising at least one elastomer material, at least one thermoplastic material, and at least two curatives are heated at a temperature and for a time sufficient to react fewer than all of the curatives present and effect partial vulcanization or cure of the at least one elastomer material. Mechanical energy is applied to the mixture during the heating step. Thus, in various embodiments, the methods provide for creating some crosslinks in the at least one elastomer during mixing. The extent of the crosslinking is limited, to an extent as described above, by adjusting the mixing time, temperature, and/or levels of curatives and/or related accelerators and co-agents in the elastomer composition.

Alternatively, the elastomeric material and thermoplastic material may be mixed for a time and at a shear rate sufficient to form a dispersion of the thermoplastic material in a continuous elastomer phase. Thereafter, the curative agents may be added to the dispersion of elastomer material and thermoplastic material while continuing the mixing. Finally, the dispersion is heated while continuing to mix to produce the processable composition of the technology. Again, the partial dynamic vulcanization is controlled such that the composition has a partial amount of curing but is still processable as a rubber composition.

In a further embodiment, the elastomer material is comprised of a first curable elastomer material and a second curable elastomer material having a different cure chemistry than the first elastomer material. Mechanical energy is applied to both elastomer materials and a thermoplastic material. A curative that is reactive with only one of the elastomer materials is also present in the elastomer/thermoplastic mixture. Alternatively, the at least one curative comprises a first curative reactive with the first elastomer and a second curative reactive with the second elastomer that reacts under different conditions, e.g. at a higher temperature, than the first curative reacts. The mixing and heating of the composition in the presence of the only curative or first curative results in a crosslinking of only one of the elastomer materials. This technique is called "fractional curing." As with other embodiments, the extent of the crosslinking is controlled in the various ways mentioned above. Additionally, the extent of crosslinking in this fractional cure embodiment may be limited by adjusting the amount of the particular elastomer material curable by the curative present in the composition.

Following partial dynamic vulcanization, a homogeneous and isolated mixture is obtained, wherein the elastomer phase comprises uncured elastomer and/or elastomer having a uniform distribution of crosslinks. Dispersed within the elastomer phase(s) are thermoplastic particles present as a discrete or non-continuous phase. The particles have an average particle size smaller than about 50 μm, and typically an average particle size smaller than about 25 μm. More typically, the particles have an average size of about 10 μm or less, particularly about 5 μm or less, and more particularly about 1 μm or less.

The size of the particles referred to above may be equated to the diameter of spherical particles, or to the diameter of a sphere of equivalent volume. It is to be understood that not all particles will be spherical. Some particles will be fairly isotropic so that a size approximating a sphere diameter may be readily determined. Other particles may be anisotropic in that one or two dimensions may be longer than another dimension. In such cases, the particle sizes referred to above correspond to the shortest of the dimensions of the particles.

One of ordinary skill in the art should also appreciate that the dimensions of the "particles" are much smaller than those that can be achieved by simply mixing ground rubber and thermoplastic particles into an elastomer material as a filler.

The thermoplastic and cured elastomer particles dispersed in the elastomer continuous phase may be observed by atomic force microscopy (AFM) performed on cryogenically microtomed cross-sections of samples of the elastomer composition. An AMF micrograph shows hard and soft regions of the composition at a resolution such that features of dimensions 1 μm and less may readily be seen. Lighter portions generally represent soft areas which are made of the uncured and cured fluorocarbon elastomer. Darker portions generally represent hard areas corresponding to the thermoplastic material. Other fillers such as carbon black and high performance reinforcing fillers are also evident as small and/or hard points that show as dark dots in the micrographs.

The homogenous nature of the compositions, the small particle size indicative of a large surface area of contact between the phases, and the ability of the compositions to be formed into shaped articles having sufficient hardness, tensile strength, modulus, elongation at break, or compression set to be useful in industrial applications, indicate a relatively high degree of compatibility between the elastomer and thermoplastic phases. It is believed such compatibility results from the partial dynamic vulcanization process. During the process, the elastomer is being crosslinked or cured while the elastomer and thermoplastic phases are being actively mixed and combined. In addition, the higher temperature and the presence of reactive curative or crosslinking agent leads to some physical or covalent linkages between the two phases. At the same time, the process leads to a finer dispersion of the thermoplastic phase in the elastomer than is possible with simple filling.

In various embodiments, the elastomer compositions are processable in conventional rubber processing equipment. Processability may be measured in terms of viscosity, for example, by Mooney rheometer according to ASTM D1646. For instance, it is contemplated that the composition has a Mooney viscosity (ML1+10@ 250° F.) from about 5% to about 100% greater than the viscosity of the uncured composition having no high performance fillers. In particular embodiments, the Mooney viscosity is from about 10% to about 50% greater, and in a particularly illustrative embodiment the viscosity is from about 15% to about 25% greater than the viscosity of the uncured composition having no high performance fillers.

The processability of the compositions may also be measured as an increase in torque on a Rubber Process Analyzer (RPA). A suitable range of increase in torque is from about 5% to about 100%, in particular from about 10% to about 50%, and in illustrative embodiments from about 15% to about 25%, in comparison to the uncured composition having no high performance fillers.

It is further contemplated that the processability of the present compositions may be determined as a measure of shear viscosity. Shear viscosity may be measured by capillary rheometer at a shear rate from about $100 \text{ s}^{-1}$ to about $1000 \text{ s}^{-1}$. In an embodiment, the shear viscosity, in comparison to the uncured composition having no high performance fillers, is from about 5% to about 100%, in particular from about 10% to about 50%, and more particular from about 15% to about 25%.

The green strength of the elastomer composition generally can be measured as a percentage of the tensile strength of the fully cured state achieved by chemically curing the composition with curatives. Acceptable green strength is greater than about 30% of the tensile strength of the fully cured composition, in particular instances greater than about 50%, and more particularly greater than about 70% of tensile strength at the fully cured state.

It should be understood that the green strength of the composition is preferably sufficient to provide dimensional stability to the composition following shaping, for instance by molding or extrusion, but prior to final curing. For example, an acceptable dimensional stability is less than about 2% change in dimensions after a 24-hour aging cycle at room temperature. In various embodiments, the stability is less than about 1% change in dimensions after a 24-hour aging cycle at room temperature. In one embodiment, the change in dimensions after a 24-hour aging cycle at room temperature is less than about 0.5%.

The processable elastomer compositions may be manufactured in a batch process or a continuous process. In a batch process, predetermined charges of elastomer material, thermoplastic material and curative are added to a mixing apparatus. In a typical batch procedure, the elastomer and thermoplastic materials are first mixed, blended, masticated or otherwise physically combined until a desired particle size of thermoplastic material is provided in a continuous phase of elastomer material. When the structure of the elastomeric material is as desired, a curative may be added while continuing to apply mechanical energy to mix the elastomer material and thermoplastic material. Partial dynamic curing, if this method of increasing green strength is chosen, is effected by heating or continuing to heat the mixing combination of thermoplastic and elastomer material in the presence of the curative. When a suitable level of crosslinking has occurred as described herein, the processable composition may be removed from the reaction vessel (mixing chamber) for further processing and/or shaping.

In an illustrative example of a continuous process, a twin screw extruder apparatus, either co-rotation or counter-rotation screw type, is provided with ports for material addition and reaction chambers made up of modular components of the twin screw apparatus. In a typical continuous procedure, elastomer material and thermoplastic material are combined by inserting them into the screw extruder together from a first hopper using a feeder (loss-in-weight or volumetric feeder). Temperature and screw parameters may be adjusted to provide a proper temperature and shear to effect the desired mixing and particle size distribution of the thermoplastic component in the elastomer material matrix. The duration of mixing may be controlled by providing a longer or shorter length of extrusion apparatus or by controlling the speed of screw rotation for the mixture of elastomer and thermoplastic materials to go through during the mixing phase. The degree of mixing may also be controlled by the mixing screw element configuration in the screw shaft, such as intensive, medium or mild screw designs. Then, at a downstream port, by using side feeder (loss-in-weight or volumetric feeder), the curative may be added continuously to the mixture of thermoplastic material and elastomeric material as it continues to travel down the twin screw extrusion pathway. Downstream of the curative additive port, the mixing parameters and transit time may be varied as described above. By adjusting the shear rate, temperature, duration of mixing, mixing screw element configuration, as well as the time of adding the curative, processable rubber compositions of the technology may be made in a continuous process. As in the batch process, the elastomer material may be commercially formulated to contain a curative.

It is further contemplated that the rubber compositions may be isolated following partial dynamic vulcanization or curing. The term "isolated" as used herein means that the compositions are not actively being processed and yet have the features described herein resulting from partial dynamic vulcanization. As a nonlimiting example, a composition following partial dynamic vulcanization may be sheeted through a mill and onto pallets for storage prior to shaping. In being isolated, the partially dynamically vulcanized compositions of the present technology do not include compositions that are fully dynamically vulcanized and that merely pass through the state of cure described herein in the process of being fully cured In various embodiments, methods include shaping the processable composition. Shaping of the processable composition according to the present technology can be performed in a variety of ways recognized by one of skill in the art as suitable for shaping uncured rubber compositions. Non-limiting examples include injection molding, compression molding, transfer molding, blow molding, single layer extrusion, multi-layer extrusion, insert molding, and calendering. Without limitation, the shapes contemplated by the present disclosure include shapes suitable for making seals, o-rings, gaskets, and hoses.

One of ordinary skill in the art should appreciate that a finite period of time may elapse between the shaping of the elastomer composition final curing of the shaped composition to form the shaped rubber article. During such time, the shaped but uncured elastomer composition may be stored, e.g. on trays or racks, or transported, e.g. by belt or skid to a curing location such as an irradiation chamber. It is therefore desirable that the uncured rubber composition maintains a provided shape and does not deform under gravitational stresses in a phenomena known as creep or cold flow (at room temperature). In certain instances, such a deformation is also known as "swell" or "shrink." Such a dimensional stability is provided by the compositions of the present technology.

The methods of the present technology further contemplate, in various embodiments, a final-cure or post-cure. The final-cure may comprise convention curing through application of temperature and pressure, e.g. curing in a mold at a temperature sufficient for the curatives to react. Such temperatures and pressures are generally known to those of skill in the art and are chosen based on the particular elastomer and curative types in the composition. Additionally, or in the alternative, the final-cure or post-cure may comprise irradiating the shaped composition. In particular embodiments, the irradiation cure is the only static cure performed.

Typically, in an irradiation cure, a source of radiation directs a beam of radiation through an irradiation chamber to a shaped article. Radiation exposure is effective in forming free radical sites in both the elastomer continuous phase and the thermoplastic dispersed phase of the composition. Free radical generation results in crosslinking of the continuous phase, crosslinking of the dispersed phase, and interlinking between the phases of the elastomer composition. Irradiation techniques suitable for curing the elastomer composition of the present technology are described in U.S. Published Application No. 2006/0003126, Park et al., "Electron Beam Curing of Fabricated Polymeric Structures," published Jan. 5, 2006 and U.S. Published Application No. 2006/0004142, Park et al., "Electron Beam Inter-Curing of Plastic and Elastomer Blends," published Jan. 5, 2006.

The interlinking of elastomer and thermoplastic phases during irradiation is also known as co-curing. The co-curing of elastomer and thermoplastic phases in elastomer/thermoplastic compositions is known to provide superior physical and chemical properties, particularly in comparison to elastomer major phase compositions having a thermoplastic dispersed phase where the only crosslinking results from a chemical cure of the elastomer phase. The presence of interbonding as described herein may be detected by use of techniques such as X-ray diffraction, fourier transform infrared analysis, gel permeation chromatography, and nuclear magnetic resonance.

Suitable types of radiation for irradiating the shaped composition of the present technology include ultraviolet irradiation, infrared irradiation, ionization, electron beam irradiation, x-ray irradiation, $\gamma$-ray irradiation, plasma irradiation, corona irradiation, and combinations thereof.

Irradiation may be performed under atmospheric conditions or in an inert environment. Suitable inert environments include an atmosphere of noble gas. In another embodiment, the inert environment is high purity nitrogen. In yet another embodiment, the pressure of the inert environment is less than 0.1 atmospheres or a vacuum.

The irradiation cure may comprise electron beam irradiation. In various embodiments, an irradiation dosage providing sufficient energy to generate residual free radical sites and cure the shaped elastomer composition of the technology is from about 0.1 to about 40 Mrad, preferably from about 10 Mrad to about 20 Mrad, and in a particularly illustrative example about 18 Mrad.

The final- or post-cure by irradiation provides further crosslinking over that obtained during a partial dynamic vulcanization and/or fractional cure described herein. For instance, stress/strain testing (ASTM D412) typically reveals that the tensile strength is increased by more than about 20%, and in particular instances between about 20% and about 100%, of the tensile strength observed with the partially cured state after electron beam exposure at a dosage of about 18 Mrad. Similarly, modulus at 50% elongation typically increases by more than about 10%, and in particular instances between about 10% and about 25%, from the modulus at the partially cured state after an irradiation dosage of about 18 Mrad. Elongation at break, or ultimate elongation, typically increases by more than about 5%, and in particular instances from about 5% to about 100%, of the elongation at the partially cured stated, following electron beam exposure with an 18 Mrad dosage.

The shaped rubber articles of the technology include, without limitation, seals, o-rings, gaskets, and hoses.

In an illustrative embodiment, a method for preparing a shaped rubber article comprises (a) admixing a fluoroplastic (FP), a fluorocarbon elastomer (FCE) in an amount greater than about 65% by weight of the total weight of the FP and FCE, and a curative reactive with the FCE, (b) partially dynamically curing the FCE with the curative to form a processable FCE major phase composition, (c) shaping the FCE composition, and (d) irradiating the shaped composition to co-cure the FCE and FP phases, thereby preparing the shaped rubber article. In a one instance the fluorocarbon is peroxide-curable and the curative comprises dicumyl peroxide. In another example, the FCE composition further comprises a high performance reinforcing filler.

In yet another embodiment, a method for preparing a shaped rubber article comprises (a) admixing a FP, an FCE in an amount greater than about 65% by weight of the total weight of the FP and FCE, and a high performance reinforcing filler (HPRF) to form a processable elastomer composition, (b) shaping the processable composition, and (c) irradiating the shaped composition to co-cure the FP and FCE phases, thereby preparing the shaped rubber article. In one instance the HPRF is aramid pulp, e.g. Kevlar or Nomex.

A further contemplated method comprises (a) admixing a FP, two different FCE materials, wherein the combined FCE weight is 65% by weight of the total amount of FP and FCE, and a peroxide curative. The first FCE is a peroxide-curable and the second FCE is polyol-curable. The method also comprises (b) shaping the composition and (c) crosslinking the peroxide-curable FCE with the peroxide curative. The shaped article is finally prepared by (d) irradiating the shaped composition, thus co-curing the FCE and the FP phases. A polyol curative may also be provided as part of the admixture. In particular instances, the polyol curative is chosen so as not to react at the temperatures at which the peroxide-curable FCE reacts with the peroxide curative. In other instances, the polyol curative is chosen so as to react with the polyol-curable FCE concurrently with the reaction of the peroxide curative with the peroxide-curable FCE.

The shaped rubber articles may have physical properties that make them useful for any number of applications requiring elastomer properties. In particular embodiments, shaped articles made from the irradiated processable compositions may exhibit a Shore A hardness of 50 or more, illustratively a Shore A of 70 or more and in particular illustrative embodiments a range of Shore A from about 70 to about 90. In addition or alternatively, the tensile strength of the shaped articles will be about 4 MPa or greater, particularly about 8 Mpa or greater, and typically about 8 to about 13 Mpa. In still other embodiments, shaped rubber articles may be characterized as having a modulus at 100% elongation of at least about 2 Mpa, particularly at least about 4 Mpa, and generally in the range of about 4 to about 8 Mpa. Shaped rubber articles of the technology may be characterized as having at least one of hardness, tensile strength, modulus, and elongation at break in the above noted ranges.

Additionally, rubber articles preferably have a compression set from about 5 to about 30 after a 70 hour aging cycle at 150° C., as determined by ASTM D3955, Method B. In specific embodiments, the compression set is from about 10 to about 20, and in more specific embodiments the compression set is less than about 15.

It should be further appreciated that, in various embodiments, methods provide additional chemical resistance to the shaped rubber articles. As an example, the fluid volume swell (ASTM D471) is reduced by about 50% to about 200% from the volume swell observed with the partially cured state following an irradiation cure. In a further embodiment of the present technology, fluid volume swell is reduced by about 75% to about 150%, and in yet another embodiment fluid volume swell is reduced by about 100% from the partially cured state following electron beam exposure at a dosage of about 18 Mrad.

In yet another embodiment, a polyol and peroxide curative are admixed in the composition with a peroxide-curable and polyol-curable elastomer. In one embodiment, the curatives are admixed with a peroxide-curable elastomer also curable with polyol curatives (for instance, an elastomer with both CSM and VDF). Such a "dual cure" composition may be partially or fractionally cured, as described herein, or the curatives may be reacted concurrently.

It has now been found that such a "dual cure" composition provides superior compression set in comparison to compositions utilizing only one type of cure chemistry. Without limiting the scope, utility or function of the present technology, it is believed that used of both peroxide and polyol curatives provides a higher crosslink density which in turn provides the cured composition with enhanced physical and chemical properties, for example tensile properties, compression set, permeability, and fluid resistance.

The shaped rubber articles prepared from such dual cure compositions may have physical properties that make them useful for any number of applications requiring elastomer properties. In particular embodiments, shaped articles made from the irradiated processable compositions may exhibit a Shore A hardness of from about 70 to about 90. In addition or alternatively, the tensile strength of the shaped articles will be about 8 Mpa or greater, typically about 8 to about 13 Mpa, and more typically from about 10 to 13 Mpa. In still other embodiments, shaped rubber articles may be characterized as having a modulus at 100% elongation of at least about 4 Mpa, generally in the range of about 4 to about 8 Mpa, and more generally in the range of about 6 to about 8 Mpa. Shaped rubber articles of the technology may be characterized as having at least one of hardness, tensile strength, modulus, and elongation at break in the above noted ranges.

Additionally, rubber articles having a dual cure according to present technology have a compression set from about 5 to about 15 after a 70 hour aging cycle at 150° C., as determined by ASTM D3955, Method B. In specific embodiments, the compression set is from about 5 to about 10, and in more specific embodiments the compression set is less than about 10.

The following non-limiting examples further describe compositions and methods of the present technology.

EXAMPLES

Examples 1-4 illustrate compositions used according to the methods of the present technology. The compositions can be made by either batch or continuous processes. All compositions described in the Examples have elastomer as a continuous phase, the elastomer being present in an amount greater than about 65% by weight of the total weight of the elastomer and thermoplastic components of the composition. All parts are listed in parts-per-hundred rubber (phr), unless stated otherwise. All processability assessments are subjective, meaning that the compositions exhibited injection moldability (less than 20,000 psi pressure required), extrudability (less than 10,000 psi extrusion pressure), smooth surface finish and acceptable mold fill.

As may be seen in Table 1A below, Examples 1a-1e illustrate compositions having a sufficient dimensional stability achieved by partial dynamic vulcanization of the compositions. Each of the compositions has a percent reduction in bisphenol curative from a level that one of skill in the art would recognize typical. The lower bisphenol curative levels limit the amount of crosslinking that occurs during the partial dynamic vulcanization process. Compositions 1a-1e exhibit subjectively good processability on conventional rubber processing equipment and all compositions exhibited a sufficient degree of dimensional stability.

TABLE 1A

| Ingredient | 1a | 1b | 1c | 1d | 1e |
|---|---|---|---|---|---|
| Bisphenol-curable Elastomer[1] | 100.0 | 100.0 | 100.0 | 100.0 | 100.0 |
| ECTFE Thermoplastic[2] | 25.0 | 25.0 | 25.0 | 25.0 | 25.0 |
| Bisphenol Curative[3] | 5.0 | 3.8 | 2.5 | 1.3 | 0.6 |
| Ca(OH)$_2$ | 6.0 | 6.0 | 6.0 | 6.0 | 6.0 |
| MgO | 3.0 | 3.0 | 3.0 | 3.0 | 3.0 |
| Other[4] | 31.0 | 31.0 | 31.0 | 31.0 | 31.0 |
| TOTAL | 170.0 | 168.8 | 167.5 | 166.3 | 165.6 |
| % CURATIVE | 50.0% | 37.5% | 25.0% | 12.5% | 6.3% |
| PROCESSABILITY | GOOD | GOOD | GOOD | GOOD | GOOD |
| GREEN STRENGTH | GOOD | GOOD | GOOD | GOOD | GOOD |

[1]Noxtite RE351 available from Unimatec.
[2]Halar 500LC available from Solvay Solexis.
[3]Bisphenol AF available from Dupont Polymer Specialties.
[4]Includes conventional carbon black fillers, inorganic fillers, plasticizers, and processing aids.

In a manner similar to Examples 1a-1e above, Examples 1f-1j are also prepared for partial dynamic vulcanization. See Table 1B. The compositions have lower levels of curing co-agent than would generally be used by one of ordinary skill in the art. Organic peroxides are also not used so that the effect of the curing co-agent is accentuated. In these examples, the co-agent is triallylisocyanurate or TAIC. The lower levels of co-agent are effective in limiting the amount of crosslinks formed during the partial dynamic vulcanization. Compositions 1f-1j exhibit subjectively good processability on conventional rubber processing equipment and all compositions exhibit a sufficient degree of dimensional stability.

TABLE 1B

| Ingredient | 1f | 1g | 1h | 1i | 1j |
|---|---|---|---|---|---|
| Peroxide-curable Elastomer[1] | 100 | 100 | 100 | 100 | 100 |
| PVDF Thermoplastic[2] | 25 | 25 | 25 | 25 | 25 |
| Co-agent[3] | 4 | 3 | 2 | 1 | 0.5 |
| ZnO | 5 | 5 | 5 | 5 | 5 |
| Other[4] | 30 | 30 | 30 | 30 | 30 |
| TOTAL | 164.0 | 163.0 | 162.0 | 161.0 | 160.5 |
| % CO-AGENT | 100.0% | 75.0% | 50.0% | 15.0% | 12.5% |
| PROCESSABILITY | GOOD | GOOD | GOOD | GOOD | GOOD |
| GREEN STRENGTH | GOOD | GOOD | GOOD | GOOD | GOOD |

[1]Tecnoflon P457 available from Solvay Solexis.
[2]Hylar MP-10 available from Solvay Solexis.
[3]TAIC, 75% dispersion available from Kenrich Petrochemicals.
[4]Includes conventional carbon black fillers, inorganic fillers, plasticizers, and processing aids.

Table 2 details the compositions of Examples 2a-2e. The compositions are prepared with a percentage of high performance reinforcing filler, in these particular examples Kevlar (aramid) pulp, for maintaining sufficient dimensional stability upon shaping. Organic peroxides are not used so that the effect of the high performance reinforcing filler was accentuated. Compositions 2a-2e exhibit subjectively good processability on conventional rubber processing equipment and all compositions exhibit a sufficient degree of dimensional stability.

TABLE 2

| Ingredient | 2a | 2b | 2c | 2d | 2e |
|---|---|---|---|---|---|
| Peroxide-curable Elastomer[1] | 100 | 100 | 100 | 100 | 100 |
| PVDF Thermoplastic[2] | 25 | 25 | 25 | 25 | 25 |
| High Performance Reinforcing Filler[3] | 1 | 2 | 5 | 10 | 15 |
| Other[4] | 30 | 30 | 30 | 30 | 30 |
| TOTAL | 156.0 | 157.0 | 160.0 | 165.0 | 170.0 |
| % H. PER. REINF. FILLER | 0.3% | 0.5% | 1.5% | 3.0% | 4.0% |
| PROCESSABILITY | GOOD | GOOD | GOOD | GOOD | GOOD |
| GREEN STRENGTH | GOOD | GOOD | GOOD | GOOD | GOOD |

[1]Tecnoflon P457 available from Solvay Solexis.
[2]Hylar MP-10 available from Solvay Solexis.
[3]Kevlar Pulp available from EI du Pont de Nemours and Company.
[4]Includes conventional carbon black fillers, inorganic fillers, plasticizers, and processing aids.

Examples 3a-3e depicted in Table 3 include compositions prepared with a first elastomer that is peroxide-curable and a second elastomer that is bisphenol-curable. The compositions are partially dynamically cured, wherein the amount of crosslink formation is controlled by the amount of the peroxide-curable elastomer available in the composition. This is an illustrative example of "fractional curing" according to the present technology. Compositions 3a-3e exhibit subjectively good processability on conventional rubber processing equipment and all compositions exhibit a sufficient degree of dimensional stability.

TABLE 3

| Ingredient | 3a | 3b | 3c | 3d | 3e |
|---|---|---|---|---|---|
| Peroxide-curable Elastomer[1] | 100 | 100 | 100 | 100 | 100 |
| PVDF Thermoplastic[2] | 50 | 75 | 100 | 143.8 | 250 |
| Co-agent[3] | 4 | 4 | 4 | 4 | 4 |
| Organic Peroxide[4] | 3 | 3 | 3 | 3 | 3 |
| ZnO | 5 | 5 | 5 | 5 | 5 |
| Bisphenol-curable Elastomer[5] | 100 | 200 | 300 | 400 | 900 |
| Other[6] | 60 | 90 | 120 | 150 | 300 |
| TOTAL | 322.0 | 477.0 | 632.0 | 805.8 | 1562.0 |
| % PEROXIDE-CURABLE FCE | 50.0% | 33.0% | 25.0% | 20.0% | 10.0% |
| PROCESSABILITY | GOOD | GOOD | GOOD | GOOD | GOOD |
| GREEN STRENGTH | GOOD | GOOD | GOOD | GOOD | GOOD |

[1]Tecnoflon P457 available from Solvay Solexis.
[2]Hylar MP-10 available from Solvay Solexis.
[3]TAIC, 75% dispersion available fro Kenrich Petrochemicals.
[4]Luperco 101 XL available from E.I. uPont and de Nemeurs.
[5]Dyneon FE5840 and BRE7231X available from Dyneon, a 3M Company.
[6]Includes conventional carbon black fillers, inorganic fillers, plasticizers, and processing aids.

Table 4 illustrates Example compositions 4a-4e. The compositions include a fluoroelastomer having both cure site monomer for peroxide curing and a vinylidene fluoride unit for bisphenol curing. The compositions further include both a peroxide reactable co-agent and a bisphenol curing package. Examples 4a-4e are suitable for partial dynamic vulcanization followed by a conventional cure where the peroxide cure package reacts and the bisphenol cure package does not react under the conditions of partial dynamic vulcanization. Upon final curing, crosslink density of the fluoroelastomer phase is higher than would occur with the use of only type of cure chemistry, resulting in the enhanced physical and chemical properties according to the present disclosure. The properties of the dual-cure compositions are tabulated as a percentage of the properties of the compositions having only peroxide curative, with increases in percentages indicating an improvement in performance.

TABLE 4

| Ingredient | 4a | 4b | 4c | 4d |
|---|---|---|---|---|
| Peroxide/Bisphenol-curable Elastomer[1] | 100 | 100 | 100 | 100 |
| PVDF Thermoplastic[2] | 25 | 25 | 50 | 50 |
| Co-agent[3] | 4 | 4 | 4 | 4 |
| Peroxide Curative[4] | 3 | 3 | 3 | 3 |
| ZnO | 5 | 5 | 5 | 5 |
| Ca(OH)$_2$ | — | 6 | — | 6 |
| MgO | — | 3 | — | 3 |
| Bisphenol Curative[5] | — | 5 | — | 5 |
| Other[6] | — | 10 | — | 10 |
| TOTAL | 137.0 | 161.0 | 162.0 | 186.0 |
| % ELASTOMER/cure type | 80% | 80%/dual cure | 67% | 67%/dual cure |
| TS | 100% | 118% | 100% | 111% |
| EB | 100% | 110% | 100% | 111% |
| M50 | 100% | 109% | 100% | 116% |
| COMPRESSION SET | 100% | 141% | 100% | 143% |

[1] Tecnoflon P457 available from Solvay Solexis.
[2] Hylar MP-10 available from Solvay Solexis.
[3] TAIC, 75% dispersion available from Kenrich Petrochemicals.
[4] Luperco 101 XL available from E.I. DuPont and de Nemeurs.
[5] Bisphenol AF available from Dupont Polymer Specialties.
[6] Includes conventional carbon black fillers, inorganic fillers, plasticizers, and processing aids.

The examples and other embodiments described herein are exemplary and not intended to be limiting in describing the full scope of compositions and methods of this technology. Equivalent changes, modifications and variations of specific embodiments, materials, compositions and methods may be made within the scope of the present technology, with substantially similar results.

What is claimed is:

1. A method for preparing a shaped rubber article, comprising
   (a) admixing a thermoplastic material, an elastomer material, and at least two curatives, wherein the elastomer material is present in an amount greater than about 65% by weight based on the total weight of the thermoplastic and elastomer materials;
   (b) partially dynamically curing the elastomer material, the partial dynamic curing comprising not reacting at least one of the curatives, wherein a processable composition is formed comprising a thermoplastic phase comprising said thermoplastic material dispersed in a continuous elastomer phase comprising said elastomer material, the composition having a green strength sufficient to inhibit substantial creep of the composition;
   (c) shaping the processable composition; and
   (d) irradiating the shaped composition, wherein the composition is finally cured.

2. The method of claim 1, wherein the elastomer material is present in an amount greater than about 80% by weight.

3. The method of claim 1, wherein the at least one of said curatives is selected from the group consisting of sulfur, sulfur donors, peroxides, polyols, and combinations thereof.

4. The method of claim 1, wherein the processable composition has a Mooney viscosity (ML1+10 @250° F.) from about 5% to about 100% greater than the uncured viscosity of the composition.

5. The method of claim 4, wherein the processable composition has a Mooney viscosity (ML1+10 @250° F.) from about 10% to about 50% greater than the uncured viscosity of the composition.

6. The method of claim 1, wherein the green strength is sufficient to provide less than about 1% dimensional change after a 24-hour aging cycle at room temperature.

7. The method of claim 1, wherein the green strength is sufficient to provide a tensile strength (ASTM D412) greater than about 50% of the tensile strength of the irradiated composition.

8. The method of claim 1, wherein the dimensions of the thermoplastic phase are less than 10 μm as measured by atomic force microscopy on cryogenically microtomed cross-sections of the shaped rubber article.

9. A method of claim 1, wherein the thermoplastic material comprises a fluoroplastic.

10. The method of claim 8, wherein the fluoroplastic is selected from the group consisting of polyvinylidene fluoride (PVDF), ethylene and tetrafluoroethylene copolymer (ETFE), ethylene and chlorotrifluoroethylene copolymer (ECTFE), copolymer of tetrafluoroethylene, hexafluoropropylene and vinylidene fluoride (THY), tetrafluoroethylene and hexafluoropropylene copolymer (FEP), tetrafluoroethylene and perfluoromethylvinylether copolymer (MFA), perfluoroalkoxy (PFA), and combinations thereof.

11. The method of claim 1, wherein the elastomer material comprises a fluorocarbon elastomer.

12. The method of claim 11, wherein the fluorocarbon elastomer is selected from the group consisting of vinylidene fluoride and hexafluoropropylene copolymer (VDF/HFP); vinylidene fluoride, hexafluoropropylene, and tetrafluoroethylene copolymer (VDF/HFP/TFE); vinylidene fluoride, perfluorovinyl ethers, and tetrafluoroethylene copolymer (VDF/PFVE/TFE); tetrafluoroethylene and propylene copolymer (TFE/Pr); tetrafluoroethylene, propylene, and vinylidene fluoride copolymer (TFE/Pr/VDF); tetrafluoroethylene, ethylene, perfluorovinyl ethers, and vinylidene fluoride copolymer (TFE/Et/PFVE/VDF); tetrafluoroethylene, ethylene, and perfluorovinyl ethers copolymer (TFE/Et/PFVE); tetrafluoroethylene and perfluorovinyl ethers copolymer (TFE/PFVE); and combinations thereof.

13. The method of claim 11, wherein the fluorocarbon elastomer is peroxide-curable.

14. The method of claim 13, wherein the fluorocarbon elastomer comprises cure site monomer (CSM).

15. The method of claim 1, wherein said elastomer material is an elastomer selected from the group consisting of polyacrylic rubber (ACM), ethylene acrylic rubber (AEM), acrylonitrile butadiene rubber (NBR), hydrogenated acrylonitrile butadiene rubber (HNBR), silicone rubber (SI), polyurethane rubber (PU), natural rubber (NR), and styrene butadiene rubber (SBR), polybutadiene rubber (BR), and combinations thereof.

16. The method of claim 1, wherein the thermoplastic material is a thermoplastic selected from the group consisting of polyolefins, polyesters, nylons, polycarbonates, styrene-acrylonitrile copolymers, polyethylene terephthalate, polybutylene terephthalate, polyamides, polystyrene, polystyrene derivatives, polyphenylene oxide, polyoxymethylene, fluorine-containing thermoplastics, and combinations thereof.

17. The method of claim 1, wherein the elastomer material comprises (i) a first curable elastomer and (ii) a second curable elastomer having a cure chemistry different than the first curable elastomer.

18. The method of claim 17, where the partial dynamic curing comprises curing only elastomer (i) or (ii).

19. The method of claim 18, wherein the elastomer (i) is a peroxide-curable fluoroelastomer, elastomer (ii) is a bisphenol-curable fluoroelastomer, and the at least two curatives comprises a peroxide curing agent and a polyol curing agent.

20. The method of claim 19, wherein the composition further comprises an olefinic co-agent having at least two sites of olefinic unsaturation.

21. The method of claim 20, wherein the olefinic co-agent is triallyisocyanurate (TAlC).

22. The method of claim 19, wherein the partial dynamic curing comprises reacting the peroxide curing agent with the peroxide-reactive elastomer at a temperature where the polyol curing agent does not react.

23. The method of claim 1, wherein the at least two curatives comprises a first curative that reacts to form crosslinks under different conditions than a second curative.

24. The method of claim 1, wherein the shaping comprises a method selected from the group consisting of injection molding, compression molding, transfer molding, blow molding, single layer extrusion, multi-layer extrusion, insert molding, and calendering.

25. The method of claim 1, wherein the irradiation is sufficient to inter-link the thermoplastic and elastomer materials.

26. The method of claim 25, wherein the type of irradiation is selected from the group consisting of ultraviolet irradiation, infrared irradiation, ionization, electron beam irradiation, x-ray irradiation, γ-ray irradiation, plasma irradiation, corona irradiation, and combinations thereof.

27. The method of claim 26, wherein the irradiation is electron beam irradiation.

28. The method of claim 27, wherein the irradiation dosage is from about 0.1 to about 40 Mrad.

29. The method of claim 28, wherein the irradiation dosage is from about 10 Mrad to about 20 Mrad.

30. The method of claim 29, wherein the irradiation dosage is about 18 Mrad.

31. The method of claim 1, wherein the composition further comprises high performance reinforcing filler.

32. The method of claim 1, wherein the shaping comprises shaping in a form selected from the group consisting of an o-ring, a gasket, and a hose.

* * * * *

UNITED STATES PATENT AND TRADEMARK OFFICE
CERTIFICATE OF CORRECTION

PATENT NO.         : 7,608,216 B2                                                         Page 1 of 1
APPLICATION NO. : 11/646315
DATED              : October 27, 2009
INVENTOR(S)        : Park et al.

It is certified that error appears in the above-identified patent and that said Letters Patent is hereby corrected as shown below:

Col. 24, line 21 (Claim 10): "chiorotvifluoroethylene" should be
-- chlorotvifluoroethylene --

Col. 24, line 23 (Claim 10): "THY" should be -- THV --

Col. 24, line 33 (Claim 12): "perfluorovinvl" should be -- perfluorovinyl --

Col. 24, line 35 (Claim 12): "tetrafluoroethvlene" should be
-- tetrafluoroethylene --

Signed and Sealed this

Seventh Day of December, 2010

David J. Kappos
*Director of the United States Patent and Trademark Office*